United States Patent [19]

Basso

[11] 4,254,85

[45] Mar. 10, 198

[54] CIRCULAR MAIL SINGULATOR

[76] Inventor: Robert J. Basso, 5333 E. Palisades Rd., San Diego, Calif. 92116

[21] Appl. No.: 65,917

[22] Filed: Aug. 13, 1979

[51] Int. Cl.[3] ........................ B65G 47/12; B65G 29/00

[52] U.S. Cl. ..................................... 198/443; 198/392

[58] Field of Search ............... 198/443, 803, 778, 434, 198/392

[56] References Cited

U.S. PATENT DOCUMENTS

| | | | |
|---|---|---|---|
| 1,833,637 | 11/1931 | Dennison | 198/392 |
| 2,941,651 | 6/1960 | Hutter | 198/443 |
| 3,061,067 | 10/1962 | Liberty | 198/443 |
| 3,109,529 | 5/1963 | Carter | 198/453 |
| 3,133,624 | 5/1964 | Graig | 198/443 |
| 3,300,022 | 1/1967 | Sterling | 198/392 |

FOREIGN PATENT DOCUMENTS

| | | | |
|---|---|---|---|
| 1229007 | 11/1966 | Fed. Rep. of Germany | 198/4 |

*Primary Examiner*—Joseph E. Valenza
*Assistant Examiner*—Brian Bond
*Attorney, Agent, or Firm*—Ralph S. Branscomb

[57] ABSTRACT

A circular mail singulator is provided having a contin ous spiral baffle which is disposed immediately above rotating annular table with a frictional top surface, the being a central cone for the delivery of envelopes int the inner convolution of the spiral and a linear co veyor tangential to the outermost convolution to r ceive envelopes delivered therefrom and, without inte rupting the envelope speed, deliver the envelopes into stamp cancelling machine.

8 Claims, 3 Drawing Figures

CIRCULAR MAIL SINGULATOR

BACKGROUND OF THE INVENTION

The invention is in the field of automatic mail processing equipment. One portion of the mail handling system in post offices in large cities includes automatic stamp cancelling equipment for envelopes that fall within certain limits as to size standardization. The mail is first hand sorted to eliminate most oversized and undersized envelopes, with the balance being dropped into a 10′ long singulator having stationary walls and a moving belt floor. The singulator has periodically extending frictional spring fingers which help to separate side by side and overlapping envelopes so that a single file stream is produced.

At the end of this singulator is a rack into which the single file envelopes are stacked, edgewise, and an automatic cancelling machine draws envelopes individually from one end of the stack and cancels the stamp. The cancelling machine is capable of accepting about 38,000 pieces of mail per hour, but the feeding is inadequate and under ordinary conditions of use, at least partially because of the inadequacy of the current signulator, only 14,000 to 20,000 pieces of mail per hour are cancelled. In addition, failure of the singulator to singulate the letter with 100% accuracy from time to time results in the jamming of the cancelling machine which, although it is being overseen by a postal operator, will ordinarily destroy several envelopes and jam up before there is time to stop the system.

For these reasons there is a need for an improved singulator which, preferably in the same 10′ spaces previously allotted to singulation, produces a stream of singulated envelopes with a non-existent, or virtually non-existent singulation failure rate.

SUMMARY OF THE INVENTION

The present invention fulfills the above-mentioned need and provides a circular singulator, 10′ or less in diameter, which provides over 120′ of singulation distance in about the same space allocated for use of previous equipment.

The basic elements of the unit are a spiral wall or baffle defining the 120′ spiral corridor through which the envelopes pass, and a rotating floor with a frictional surface which draws the mail through the spiral corridor. The mail is delivered to the inner convolution of the spiral by means of a cone which may or may not be caused to rotate in the opposite direction of the rotating floor. The floor rotates in such a direction that mail deposited in the inner convolution from the cone is drawn into the progressively outer convolutions, and therefore picks up a considerable amount of speed over that which it had in the inner convolution due to the unchanged angular velocity coupled with the doubling or so of the diameter of the trajectory. This enables the mail to be deposited on a slow moving portion of the frictional table to ease the transition between the stationary mail and its moving phase, and then the mail is smoothly accelerated to a much higher speed which is adjusted to coincide with the proper speed of delivery into the cancelling machine.

An interfacing conveyor belt delivers the singulated envelopes from the outer convolution, with unchanged speed, into the cancelling machine, which is then able to cancel at virtually its maximum rate of 38,000 pieces p hour.

DETAILED DESCRIPTION OF THE PREFERRED EMBODIMENT

Figure 1:
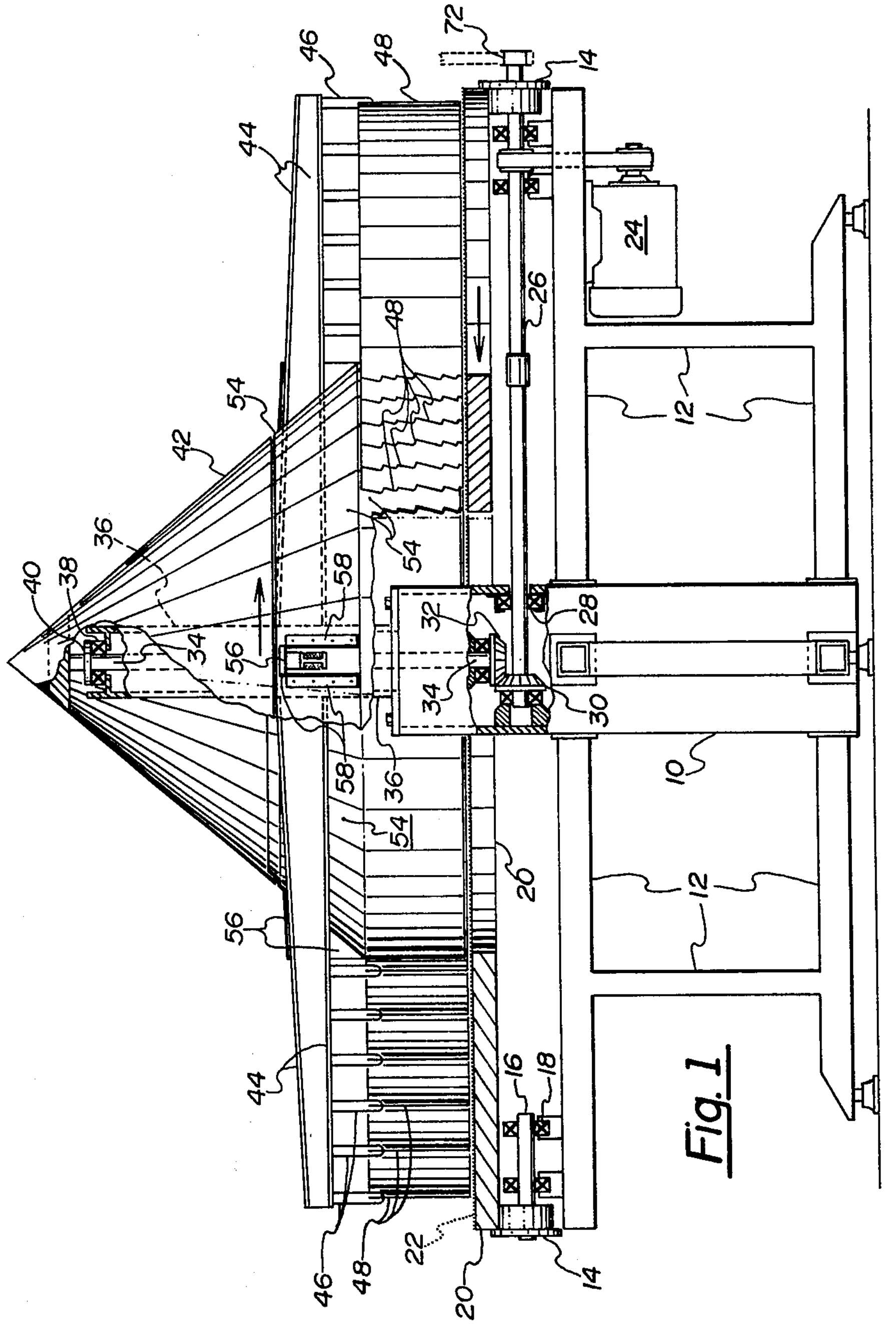
FIG. 1 is a side elevation of the unit with the left a central portions cut away.

The singulator utilizes a framework having a cent column 10 and four radial frame members inclusive designated at 12. Each of the frame members 12 su ports at its outer end a support roller 14 mounted or shaft 16 journaled in bearings 18.

The rollers are shaped like railroad wheels and bc capture and support for rotational movement an over ing annular table 20 which has a frictional coating 22 its top surface. The table is rotated in the directi indicated by the arrow by means of electric motor mounted beneath one of the frame members 12. I virtue of drive shaft 26 which passes into the cent portion of the cone 10 through bushing 28, a bevel ge 30 drives an orthogonally oriented second bevel gear mounted on a shaft 34 which extends up through reduced diameter upper hollow column 36 and is su ported by this column through bearings 38 bene flange 40. The shaft continues upward and mounts t upper portion of a cone 42 which by virtue of t above-described structure is caused to rotate in t direction opposite the direction of rotation of the an lar table 20.

Whereas the upper cone portion rotates one directi and the lower table rotates the other, all the structu between the upper cone and the table is stationary a is mounted as follows. Four radial I-beams of decre ing height from inner to outer end extend from the f sides of the upper column 36 as is best seen in FIG. The principal purpose of these beams is to suppc through mounting brackets 46, a spiral baffle 48. T baffle or wall begins at its inner end at 50 and contin outwardly continuously and terminates at 52 to defin continuous corridor between adjacent convolutions the spiral.

Mounted midway out on the radial beams 44 i frustocone 54 defining a smooth continuation of surface of the upper cone portion 42 down to the v upper edge of the baffle 48. Where the beams p through the frustocone they are provided with cov 56, each of which has flanges indicated in FIG. 1 at which are spot welded or otherwise attached to frustoconical surface so that envelopes sliding down cone do not get caught in the structure of the I-bea It can be seen that as the annular floor of the u rotates in the direction indicated in FIG. 1 and conical member 42 rotates in the opposite directi mail dropped on this cone will slide down onto frustocone 54 and thence into the innermost conv tion or corridor 60 where it is engaged by the frictic surface 22 of the table 20 and carried out at increasin large circles unitl it reaches the outermost limit 52 of spiral wall. At this point the mail shoots out tangenti of the spiral under the guidance of deflector 62 chute 64 which delivers the mail, which is now mov a relatively high speed, onto a high-speed conveyor ıgrammatically illustrated at 66. The conveyor then :roduces the still moving mail into a cancelling ma- ine. The speed at which the cancelling machine oper- ɜs is the speed to which the conveyor 66 and the tating table 20 are synchronized.

When the mail is introduced into the inner corridor , it is free to overlap one envelope over the other, ıich condition it is of course the purpose of the sin- .lator to eliminate. As the mail moves outwardly, riodically along the corridor walls are placed spring ıgers 68 which have frictional surfaces along their ɜtal ends to delay the innermost envelope of a group two or more envelopes passing these points. As the eed of a corridor picks up radially outwardly, there is ɔre length along the pathway so that the circular lumn of envelopes can be expanded to be spaced in ıgle file prior to being ejected onto the conveyor 66. ıere could, of course, be more spring fingers 68 and her singulation enhancing structures throughout the ıgth of the corridor, as there is plenty of room to ɔorporate any such structure desired.

Figure 2:
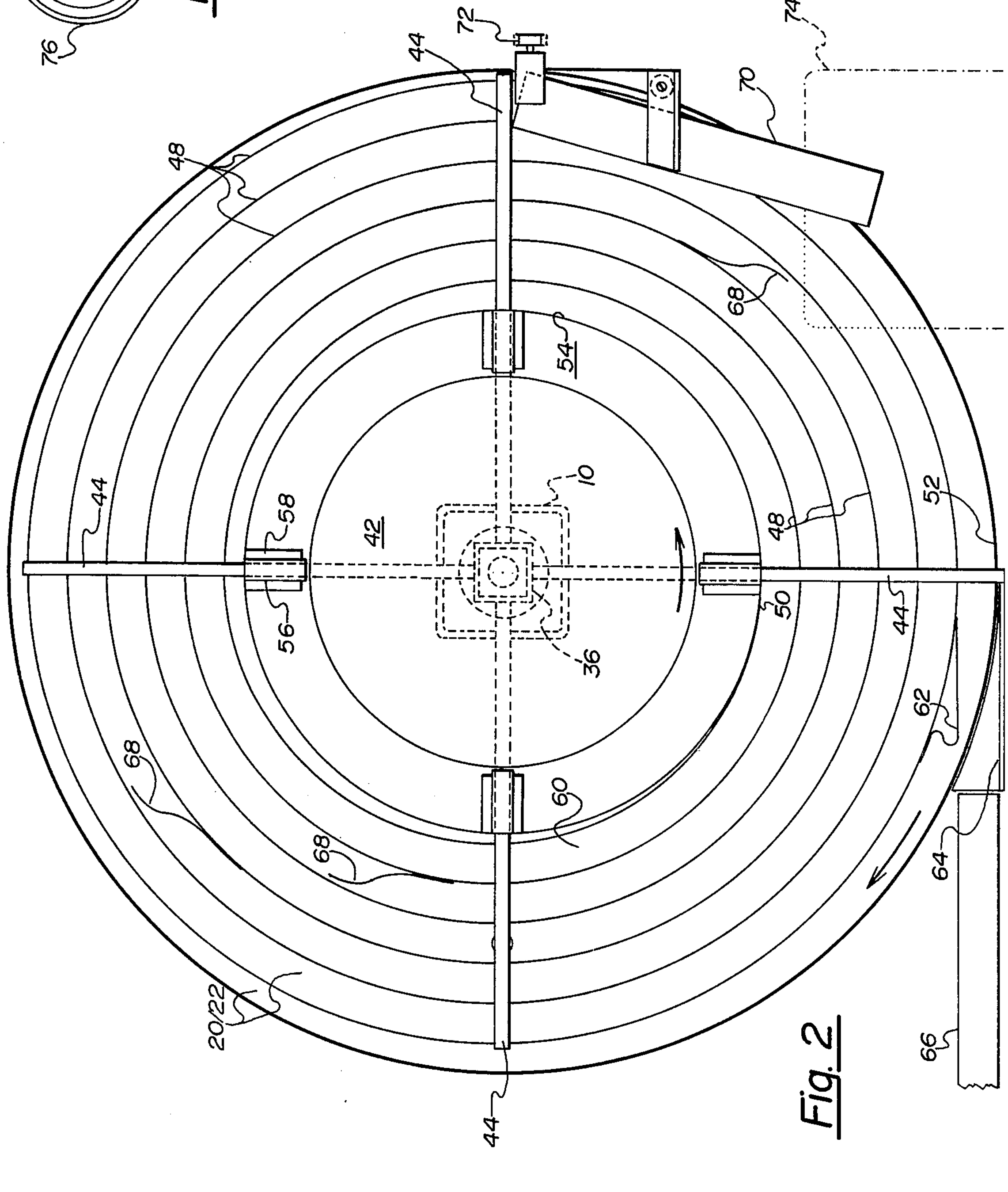
FIG. 2 is a top elevation view of the unit with t upper portion of the cone removed.

A structure which has not been heretofore mentioned a flats extractor which is diagrammatically illustrated FIG. 2 and will not be described in detail as it is ındard equipment in a conventional singulator. This tractor, indicated at 70, is incorporated in the draw- ʒ to illustrate that it may be driven off of pulley 72 by ɘ main motor of the instant device. The flats extractor 'hich has been omitted for clarity in FIG. 1) com- ises basically a pair of rollers positioned just high ough to grab the tops of envelopes that are too high d drive them through belts driven by the roller and ɜct them into a flats hamper 74.

Figure 3:
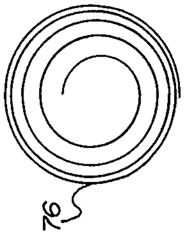
FIG. 3 is a diagrammatic view of a modified form the spiral baffle in which corridor thickness progr sively decreases radially outwardly.

Turning to FIG. 3, an alternate orientation of the iral baffle is shown at 76 in which the distance be- 'een adjacent baffle portions decreases progressively ward the outer edge of the annular table. This is es- ntially a space-saving measure and is made possible by ɘ fact that as the speed of the envelopes increases, and they are stretched out single file in their respective ɪrtions of the corridor, they require less thickness to comodate them.

The invention is thus shown, described and claimed, exemplary of a number of variations which could ɜarly be incorporated within the scope of the claims, ɔluding means of supporting the baffles and the two ne portions and means of driving those elements ıich rotate. Additionally, an embodiment to be specif- ılly mentioned herein is one in which the upper por- ɪn 42 of the cone is non-rotational and simply is an tension of the frustocone 54. The incorporation of tation in the upper portion of the cone represents an ded feature to prevent the possible hanging up or cking up of the mail, for example on top of the radial ams 44. This problem would be effectively eliminated the rotation of the upper portion of the cone and in neral the singulation of the mail would appear to get early start by virtue of the counter rotational action this cone.

It should be noted that one side of the spiral baffle uld be coated with a slight frictional coating to pro- ɖe a continuous singulating effect. The spiral could tate over a stationary table as a possible modification, d dimensions and proportions could be modified to ıgulate oversized flats, packages, and even non-posted ticles of manufacture.

By the implementation of the singulator described herein post offices will considerably increase the speed at which their existing cancellation machines operate, enabling them to postpone or avoid entirely purchasing new equipment, and perhaps will even enable them to eliminate an operator whose sole purpose it is to observe the operation of the currently used singulator and its interface with the cancellation machine to prevent disaster in case of jamming or failure of the singulator.

What is claimed is:

1. A circular mail singulator comprising:

(a) a fixed continuous vertical spiral baffle;

(b) a rotating table having a frictional surface disposed beneath said baffle and rotating in a direction such that envelopes purchased by said frictional surface are drawn radially outwardly by the increasingly large convolutions of said baffle and increased in linear speed;

(c) delivery means for delivering said envelopes to an inner convolution of said spiral baffle;

(d) said delivery means comprising a cone mounted centrally over said baffle and positioned to slide mail dropped thereon out the innermost convolution of said baffle, at least a portion of said cone rotating counter to the direction of rotation of said table to ensure proper feeding of envelopes into said spiral baffle; and (e) conveyor means for removing singulated envelopes from the outermost convolution of said baffle.

2. The structure according to claim 1 wherein said portion of said cone and said table are mechanically linked to concommitantly rotate in opposite directions.

3. The structure according to claim 2 wherein said rotating portion of said cone comprises the upper portion and a lower portion in the shape of a frustocone in fixed relationship to said baffle.

4. The structure according to claim 3 wherein said lower cone portion and said spiral baffle are mounted on a pair of crossbars suspended over said rotating table.

5. A method for high-speed singulation of flat, thin mail parcels in a circular singulator having a fixed continuous vertical spiral baffle with an open outermost end, said baffle being mounted just above, and spaced over, a rotatable substantially flat table with a frictional surface, said method comprising the following steps:

(a) causing said table to rotate such that any mail parcel purchased by said table will rotate increasingly outwardly on said table between adjacent convolutions of said baffle;

introducing flat, thin mail parcels onto a cone positioned over said table between inner convolutions of said baffle at least a portion of said cone rotating relative to said rotating table such that as said parcels are drawn between adjacent baffle convolutions centrifugal force urges same flat against the radially outer baffle surface of the respective adjacent baffle convolutions; and (c) as the parcels separate due to the increased linear speed of the table, individually drawing them off said table tangentially thereto at the outermost end of said baffle.

6. A method according to claim 5 wherein said table has a circular circumference and including a linear conveyor belt generally tangential to said table circumference and defining a linear corridor substantially aligned with the velocity vector of said table beneath the outermost end of said baffle, and step (c) includes operating said conveyor at a linear speed at least as great as that of the circumference of said table.

7. A method according to claim 5 wherein said circular singulator includes a central upright cone and step (b) comprises introducing parcels onto said cone.

8. A method according to claim 5 wherein said singulator includes a plurality of frictional spring finge extending radially outwardly from the radially out surface of said baffle toward the radially inner surfa of the next respective convolution of said baffle, ar step (a) includes drawing envelopes past said fingers.

* * * * *